Oct. 20, 1931.   F. W. HENKE, JR   1,828,658
ANTITHEFT TIRE LOCK
Filed June 8, 1928
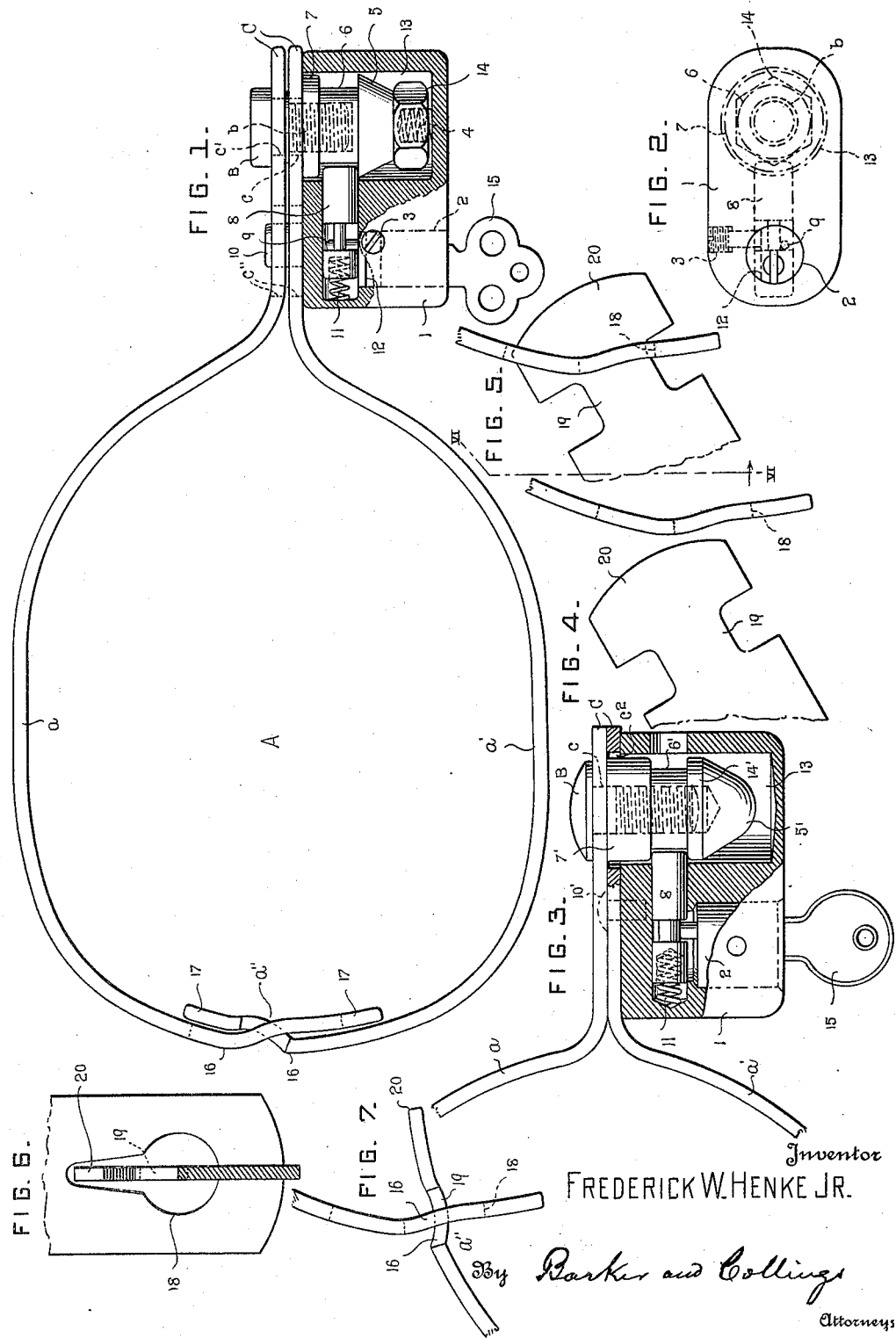
Inventor
FREDERICK W. HENKE JR.
By Barker and Collings
Attorneys Patented Oct. 20, 1931

1,828,658

UNITED STATES PATENT OFFICE

FREDERICK W. HENKE, JR., OF PHILADELPHIA, PENNSYLVANIA, ASSIGNOR TO FOX AUTOMOTIVE PRODUCTS CORPORATION, OF PHILADELPHIA, PENNSYLVANIA, A CORPORATION OF DELAWARE

ANTITHEFT TIRE LOCK

Application filed June 8, 1928. Serial No. 283,945.

The present invention relates to locking means for the spare tires of vehicles, particularly the pneumatic tire of an automobile while carried as a spare upon the vehicle; and has for its object to produce an article of this character that is simple in construction and effective as an anti-theft lock and which contains features of novelty the advantage of which will be pointed out herein.

In the accompanying drawings Fig. 1 is a side elevation with parts in section, illustrating the lock in closed position—that is in the position occupied when locking a tire upon the felly of a wheel which may be carried as a spare wheel, or upon the support for the tire rim when only the demountable rim and tire are carried as a spare.

Fig. 2 is an end or face view of the lock detached.

Fig. 3 is a sectional view similar to Fig. 1 illustrating a different form of the invention.

Fig. 4 is a detached view of the hinged ends of the tire-encircling band in the positions they assume when the two parts of the band are about to be connected.

Fig. 5 is a view showing the hinged parts of the band with the headed portion thereof in the act of passing through the opening in the other section.

Fig. 6 is a sectional view on the lines VI—VI of Fig. 5.

Fig. 7 is a view of the parts of the hinge properly united and in the position they assume when the sections of the band are open to receive a tire.

The locking device represented herein comprises a band adapted to encircle a tire and the rim or felly to which it is applied and such band is designated as a whole by A. This band preferably consists of two sections $a$, $a'$, that are hinged together at $a''$ and have their free ends, C, preferably flat and straight, so that they may lie in parallel superposed relation to each other as indicated in Fig. 1. The hinge-connected portions of the sections $a$, $a'$ of the band are reversely bent near their ends as indicated at 16, 16 Fig. 1, so that each end portion 17 beyond a reverse bend 16 overlaps, on the inside, the part of the opposite band section to which it is connected, lying close thereto, as shown in Fig. 1. In the hinge connected end of one section of the band there is formed a keyhole-shaped opening 18, while the connected end of the other section is notched at its sides to form a neck 19 beyond which the band is of full width forming a head 20. To unite the sections, one of them is turned at right angles to the other so that the head 20 can be passed through the keyhole-shaped opening 18, as represented in Figs. 5 and 6. When the head 20 has been passed entirely through the opening 18 the band section carrying the head is given a quarter turn, the neck 19 revolving in the circular portion of the opening 18 until the parts assume the position indicated in Fig. 7, when the two sections may be moved relative to each other upon the hinge $a''$, either opening the band to permit it to be placed about a tire, or closing it to lock the tire to its support. It will be understood that the hinge described, while permitting the ready connection or separation of the sections of the band, nevertheless operates to prevent separation of the parts, while allowing free hinging movements when the band sections are turned to the position indicated in Figs. 1 and 7.

Referring now particularly to that form of the invention represented in Fig. 1, it will be seen that in the free end C of one of the band sections is an aperture $c'$ in which may be supported a stud B, it being fixedly secured in any suitable way in such aperture $c'$ formed therefor in the part C. The stud is preferably provided with a head as represented and has its inner end extended and externally screw-threaded. This end of the stud is adapted to project through an opening $c$ formed in the flat part C of the band section that is opposed to the section directly carrying the stud. Apertures $c''$, $c''$, preferably in the form of short slots, are formed through the parts C of the band sections to one side of, but adjacent to, the openings $c$, $c'$.

7 indicates a nut adapted to engage with the screw-threaded end $b$ of the stud B, and operating to hold together the two portions C of the band sections, thus forming the band into a closed loop as indicated in Fig. 1, which may encircle a tire and the rim or felly on which it may be seated, and so serve as a locking means for preventing unauthorized removal of the tire. The nut 7 has formed in its exterior a circumferential groove 6, has a conical portion 5 beyond the groove, and an angular portion 14 beyond the conical part, adapted to be engaged by a wrench.

The nut 7, when applied to the stud B and screwed into place to hold the sections of the band together, is adapted to be covered by a guard 1, which also serves as a casing in which is mounted a lock 2. The guard 1, as seen from the end, as in Fig. 2, is preferably of oblong shape, the ends being rounded, and in one end of the body of the guard is formed a chamber 13, to be occupied by the nut 7 when the guard is in use, while in the opposite end is mounted the rotary cylinder of a lock adapted to be manipulated by a key 15. The lock may be of any suitable construction, that shown being formed with a cam pin 9 at the inner end of the rotary cylinder 2 that is adapted to throw a plunger 8 that is preferably movable in a path at right angles to the axis of the cylinder, and the free end of the plunger extending into the chamber 13 and being adapted to lie in the circumferential groove 6 in the nut 7. A spring 11 acts upon the plunger and tends to move it into position to engage with the nut. A screw or pin 3 seated in the body of the guard and engaging with a groove formed in the periphery of the lock cylinder 2 limits the movement of the latter in a well-known manner.

The chamber 13 is open-ended at one (the inner) face of the nut guard, so that the latter may be readily applied to the nut, while the opposite end of the chamber is closed by the integral wall of the guard constituting its front exposed face. A short stud or projection 10 extends from the inner face of the nut guard and is adapted to enter the apertures $c''$ when the guard is applied.

In Fig. 3 is shown an embodiment of the present invention somewhat different from that represented in Fig. 1. Referring to such view it will be seen that the opening $c^2$ through the lower band section $a'$ is considerably larger than the corresponding aperture $c$ in Fig. 1, being of a size large enough to permit the nut 7' to pass through it. This permits the nut to be screwed on to the threaded stud B sufficiently far to engage with the inner face of the portion C of the upper band section $a$ thus uniting the stud securely to such said section $a$. With this arrangement the special nut 7' is supposed to remain permanently in clamping position, holding the stud B in place, and in this respect it differs from the special nut 7 of Fig. 1 which is removed from the stud each time the band A is opened.

The nut 7' is provided with a circumferential groove 6'. The conical portion 5' of the nut 7' is at the extreme end of the latter as indicated, a cylindrical portion 14' that bounds the groove 6' on one side being immediately inside the conical part 5'. The guard that houses the nut 7' and also encases the lock 2 is represented as being secured to the portion C of the band section $a'$ by a bolt or screw of which one or a plurality may be employed as is most desirable. The head 10' of the connecting screw or bolt is adapted to enter a recess shaped to receive it formed in the opposite portion C of the band $a$. This projection 10' takes the place of the projection 10 shown in Fig. 1 and operates to prevent any sliding movement of the two free end portions of the band when locked together.

The tire locking device represented in Fig. 1 is used as follows:

When a tire is to be locked upon its rim, or wheel felly, the two sections of the band A are opened, turning on the hinge $a''$, the band is placed over the tire, the ends of the band sections brought together causing the screw-threaded end of the stud B to pass through the aperture $c$, and then the nut 7 is screwed upon the exposed end of the stud. This operation causes the band to encircle the tire and rim or felly, as a loop held closed by the nut. The nut guard and lock are then applied, the lock cylinder having been turned by the key to throw the plunger or bolt 8 inwardly, that is with its end entering the chamber 3. With the form of lock shown the key may now be removed and the spring 11 will hold the bolt in its thrown or locking position, permitting it, however, to be moved inwardly, as by engagement with the cone portion 5 of the nut 7 as the guard is placed over the nut. As soon as the end of the plunger passes the cone 5 and comes opposite the groove 6 the spring 11 moves the plunger, causing it to enter such groove and locking the guard in position covering and enclosing the nut, and the plunger of the lock holds the guard in this covering position until the lock is manipulated by the key 15 to withdraw the plunger. As the guard comes into position covering and enclosing the nut, the stud or projection 10 enters the recess $c''$, or one of them if the stud is short, and this engagement of the nut guard and lock carrier with the tire band prevents its movement relative to the nut in rotative directions, as well as prevents one section C to slide on the other. Without the use of the projection 10 the guard would be locked in position covering the nut and there secured, even though the guard might then be free to rotate about the nut, the end of the bolt or plunger 8 traveling in the groove 6, but this might be objectionable and therefore the stud or projection 10 is provided to prevent such relative movement.

In using the form of invention illustrated in Fig. 3 the special nut 7' does not have to be removed from the stud and applied thereto each time the band is opened or closed, but is screwed tightly upon the bolt or stud B once and for all. When the band is closed about a tire the nut guard is carried over the nut 7' and locked thereto the same way that the guard is locked to the nut 7 of Fig. 1, and when so locked the band is held about the tire until the lock is manipulated by the use of the proper key to separate the plunger 8 from the circumferential groove in the special nut, whereupon the guard may be removed and the locking band opened.

A spring 4 is shown in Fig. 1 between the end of the nut 7 and the wall of the housing closing the outer end of the chamber 13, to prevent rattling of the guard and the parts which it carries, the spring being compressed as the guard is placed over the nut and there locked in place. The spring 4, however, may be omitted if not desired.

It is obvious to those skilled in the art that the details of construction as well as the precise arrangement of parts of the tire locking means herein described may be varied without departing from the spirit of the invention; as for instance, to cite but a single illustration, by making the band of a unitary piece, as illustrated in the patent to C. A. Godshalk, 1,570,477 of January 19, 1926, instead of two sections, as illustrated; and therefore it is to be understood that the invention is not limited beyond the scope of the claims as they are to be properly understood and construed.

It will be also understood that the specific form of nut guard and lock herein illustrated and described may be used as a part of a tire locking device that does not include a band such as A, as for instance by using it in connection with a holder for a spare tire and rim, a bracket and a clamp piece, as illustrated in Patent 1,625,658 to F. W. Henke, Jr., dated April 19, 1927.

Claims:

1. An anti-theft tire locking device comprising a nut adapted to be applied to a screw-threaded stud, the nut having a circumferential groove near its inner end, a conical portion outside of the groove and a portion to be engaged by a wrench outside the conical part, and a guard for covering and housing the nut having a body in one portion of which is a cavity for the nut and in another portion of which is a key-operated lock, the lock having a plunger the end of which extends into the nut chamber of the housing, the plunger being spring-operated and arranged to engage with the conical part of the nut and to be moved against the spring as the guard is applied to the nut and adapted also to engage with the grooved portion of the nut through the action of the spring when such end passes said conical part and the guard comes to proper position to house the nut.

2. An anti-theft tire locking device comprising a nut adapted to be applied to a screw-threaded stud the nut having an exterior circumferential groove, and a conical portion toward the end of the nut beyond the groove, a guard for covering and housing the nut having a body in one portion of which is a cavity for the nut and in another portion, to one side of the nut cavity, another cavity for a lock and a lock having a plunger the end of which extends into the nut chamber of the housing, the plunger being spring-operated and arranged to engage with the conical part of the nut and to be moved backward against the action of the spring as the guard is applied to the nut, and is also adapted to engage with the groove in the nut through the action of the spring when its end passes the said conical part of the nut and the guard comes to proper position to house the nut.

In testimony whereof I affix my signature.
FREDERICK W. HENKE, Jr.